United States Patent
Patterson et al.

(10) Patent No.: US 6,915,316 B1
(45) Date of Patent: Jul. 5, 2005

(54) RESYNCHRONIZATION OF A TARGET VOLUME WITH A SOURCE VOLUME

(75) Inventors: Hugo Patterson, Mountain View, CA (US); Michael Federwisch, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 22 days.

(21) Appl. No.: 10/736,215

(22) Filed: Dec. 15, 2003

Related U.S. Application Data

(63) Continuation of application No. 09/825,855, filed on Apr. 3, 2001, now Pat. No. 6,668,264.

(51) Int. Cl.$^7$ .............................................. G06F 17/30
(52) U.S. Cl. ...................... 707/205; 204/203; 204/101; 204/6
(58) Field of Search ................................ 707/203, 204, 707/205, 101, 6; 711/162, 161; 709/201

(56) References Cited

U.S. PATENT DOCUMENTS

| | | | |
|---|---|---|---|
| 5,835,953 A | | 11/1998 | Ohran |
| 5,907,672 A | * | 5/1999 | Matze et al. .................... 714/8 |
| 5,996,086 A | * | 11/1999 | Delaney et al. ................ 714/4 |
| 6,000,039 A | * | 12/1999 | Tanaka et al. ................. 714/6 |
| 6,078,932 A | * | 6/2000 | Haye et al. .................. 707/204 |
| 6,119,244 A | * | 9/2000 | Schoenthal et al. ............ 714/4 |
| 6,131,088 A | * | 10/2000 | Hill ............................... 705/27 |
| 6,212,531 B1 | * | 4/2001 | Blea et al. ................... 707/204 |
| 6,360,330 B1 | | 3/2002 | Mutalik et al. |
| 6,377,951 B1 | * | 4/2002 | Campbell ..................... 707/10 |
| 6,453,325 B1 | | 9/2002 | Cabrera et al. |
| 6,529,921 B1 | | 3/2003 | Berkowitz et al. |
| 6,529,944 B1 | * | 3/2003 | LeCrone ..................... 709/211 |
| 6,643,671 B2 | * | 11/2003 | Milillo et al. ............... 707/204 |
| 6,668,264 B1 | * | 12/2003 | Patterson et al. ........... 707/205 |

FOREIGN PATENT DOCUMENTS

WO        WO 94/29796 A1        12/1994

OTHER PUBLICATIONS

M. F. Dolan "Aminimal duplex connection capability in the top three layers of the OSI reference model", ACM, 1984, pp. 195–200.*

Leslie Jill Miller, The ISO reference model of open system interconnection: A first tutorial, ACM'81, Nov. 9–11.*

Beltrane et al., "An APL interface to the open system interconnection for labor scale application systems", ACM, 1984, pp. 25–31.*

* cited by examiner

*Primary Examiner*—Jean M. Corrielus
(74) *Attorney, Agent, or Firm*—Swernofsky Law Group PC

(57) ABSTRACT

An improved method and apparatus for quickly and efficiently updating the original source volume and original target volumes after the original source volume has become temporarily unavailable. The original target volume is characterized as a source volume while the original source volume is temporarily unavailable. Transfer lists of different data blocks are generated. Data blocks not originally found on a source are copied to the target. Data blocks included on a target that were not found on the source are removed. By focusing upon specific data blocks, this technique avoids the use of filer overhead and other computational resources that would be expended if the entire volume were recopied.

28 Claims, 3 Drawing Sheets

RESYNCHRONIZATION OF A TARGET VOLUME WITH A SOURCE VOLUME

CROSS-REFERENCE TO RELATED APPLICATION

This application hereby incorporates by reference and is a continuation of application Ser. No. 09/825,855, filed Apr. 3, 2001, now U.S. Pat. No. 6,668,264.

BACKGROUND OF THE INVENTION

1. Field of the Invention

This invention relates to data storage systems; in particular, the invention relates to synchronization of source and target volumes in a mirrored storage system.

2. Related Art

Snapshots and multiple volumes are frequently used to prevent data loss when a data storage drive fails in a file system. Such snapshots "capture" the contents of the files and directories in a volume at a particular point in time in order to recover earlier versions of a file following an unintended deletion or modification. Such snapshots can also be copied to one or more volumes, which then can be used as a mirror or a collection or mirrors and which can provide a back-up copy of the file system. When used in this way, the mirror can be referred to as a target volume. In general, a target volume is a "read-only" volume that contains a set of data that is equivalent to the set of data on an original source volume. Such target volumes can be written to only by the original source volume.

A target volume may be updated periodically with respect to a source volume by looking to the most recent snapshot that the target and source have in common and using that snapshot as a consistency point (CP). The file blocks in the most recent common snapshot and the file blocks of a new snapshot are compared. The set of differences resulting from this comparison are written to the less up-to-date volume. In this way, both source and target volumes maintain equivalent sets of file blocks.

A source volume may become unavailable due to a failure of the source volume or to a failed connection to the source volume. Under such conditions, it is advantageous to temporarily use the target volume as a source volume by designating it as a "read/write" volume. User I/Os are directed to write to the target volume while the original source volume is unavailable.

One problem with writing to a target volume is that it may cause the target volume to contain data not found in the original source volume. A partial solution to this problem involves transferring data from the target to the source once the source is restored. However this is undesirable because it requires diversion of computational resources and filer overhead.

Accordingly, it would be advantageous to provide an improved technique for quickly and efficiently updating source and target volumes after a target volume has been written to. This is achieved in an embodiment of the invention that addresses the foregoing deficiencies.

SUMMARY OF THE INVENTION

The invention provides an improved method and apparatus for quickly and efficiently updating an original source volume and an original target volume after the original target volume has been used as a source volume in a file system. One or more snapshots are used to compare data included in the source and target volume. Instead of transferring the entire volume, only the data that is missing from a source and a target volume is transferred.

In a first aspect of the invention, a target volume becomes synchronized with a source volume after the target has been written to by an entity other than the source. Synchronization is a two phase process. In the first phase, a target volume provides the source volume with a list of snapshots and associated snapshot numbers used to determine the sequence of the snapshots on the list. The source volume compares its own list of snapshot numbers with the list of the target volume's snapshot numbers and determines the newest common snapshot. This newest common snapshot is a consistency point between the target volume and the source volume. The source volume sends the target volume a set of snapshot numbers describing the newest common snapshot and the target volume reverts back to this snapshot. In the second phase, file system software identifies all the data blocks contained in any one or more of the snapshots of the source volume. This file system software also identifies all the data blocks in any one or more of the snapshots of the target volume using the data sent by the target volume to the source volume as described supra. A set of data blocks that are included in the source volume and not included in the target volume is generated. This can be accomplished by making a comparison based on logical differences, generating a virtual or actual list or other techniques known in the art.

File system software synchronizes the target volume with the source volume. First, the file system software removes snapshots from a target volume if the snapshots are not included in the source volume's snapshot list. Second, the file system software adds the set of data blocks identified above (that is the set of data blocks that are included in the source volume and not included in the target volume) to its memory. Lastly, the file system software adds snapshots to the target volume if the snapshots are included in the source volume's snapshot list and not in the target volume's snapshot list. At this point, the target volume includes the data blocks that are present on the source volume.

In a second aspect of the invention, the roles of the target volume and source volume are reversed and the process described supra is performed again so as to synchronize source volume with the target volume. This is necessary because the target volume may include data blocks not included in the source volume. After both source and target volumes are synchronized, the target volume stops being written to and the source once again is used as the active file. This is accomplished by 1) designating the target as a read-only volume, 2) designating the source as a read/write volume, and 3) redirecting users' I/O's back to the source volume.

In a preferred embodiment, sources and volumes can be synchronized dynamically, using a WAFL (Write Anywhere File Layout) system using RAID (Redundant Arrays of Independent Disks) architecture. However, various other types of file systems involving redundant copies of data can also be used.

Lexicography

The following terms are related to aspects of the invention as described below. The general meanings of these terms are exemplary and in no way limiting.

Source volume—in general, the term "source volume" refers to a read/write volume.

Target volume—in general, the term "target volume" refers to a read-only volume that is used to back-up other data. However, in the event that a source volume becomes unavailable, a target volume may be designated as "read/write" and used as a source.

Synchronize—in general, the term "synchronize" refers to the process of conforming a first set of snapshots to a second set of snapshots.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits adapted to particular process steps and data structures described herein. Implementation of the process steps and structures described herein would not require undue experimentation or further invention.

System Elements

Figure 1:
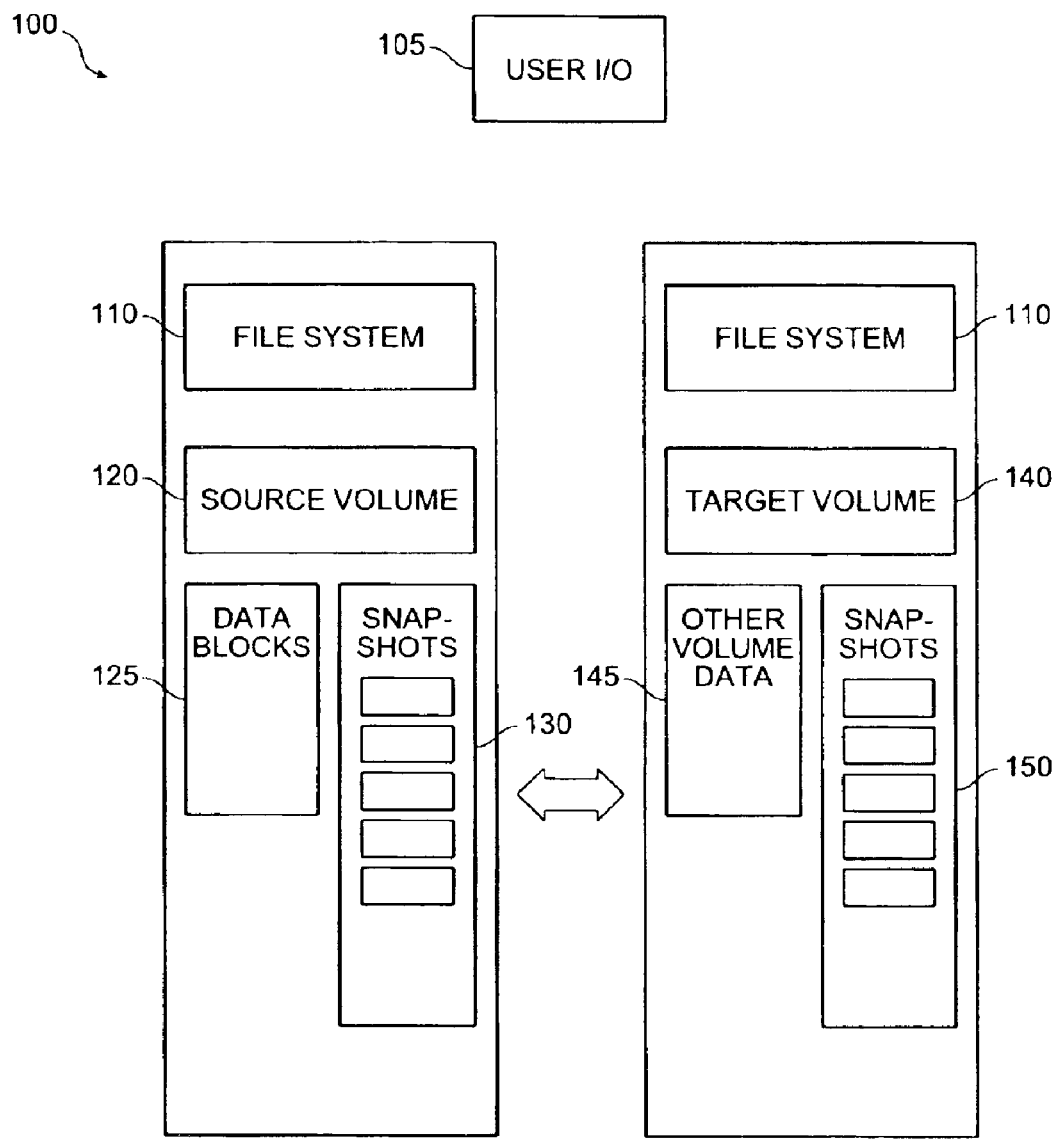
FIG. 1 shows a block diagram of a system for synchronizing a target volume to a source volume.

FIG. 1 shows a block diagram of a system for synchronizing a target volume to a source volume.

A system for synchronizing a target volume to a source volume (shown by general character reference 100) includes a file system 110, upon which resides one or more source volumes 120, one or more target volumes 140, and logic 115. In a preferred embodiment, the file system 110 is part of a larger computer system including a memory and a processor. The file system 110 is coupled to an I/O port 105.

The source volume 120 includes a set of data blocks 125 and a set of snapshots 130. The set of data blocks 125 both data and meta-data.

The set of snapshots 130 includes individual snapshots that correspond to the set of data blocks 125 at various points in time. A snapshot includes a map of blocks at a consistent point in the file system, but preferably not the blocks themselves. The individual snapshots include snapshot numbers which refer to the relative age of the snapshot. In a preferred embodiment, the higher snapshot numbers correspond to more recent snapshots and lower snapshot numbers correspond to older snapshots. Although the snapshot numbers shown in FIG. 1 are sequentially numbered from one to six, the numbering of the snapshots may reflect deletion of a particular snapshot. Both the number and type of data blocks in the set of data blocks 125, as well as the number and sequence of snapshots in the set of snapshots 130, are exemplary and in no way limiting.

In a preferred embodiment, the source volume 120 is a read/write volume that receives user I/Os 105. A system 100 may include a plurality of source volumes 120. In the event that a source volume 120 becomes unavailable, a target volume 140 may be temporarily used as a source volume 120.

The target volume 140 includes a set of data blocks 145 and a set of snapshots 150. Similar to the set of data blocks 125 included in the source volume 120, the set of data blocks 145 includes individual data blocks, indirect data blocks, and double indirect data blocks. The set of snapshots 130 (which are themselves data blocks) includes individual snapshots of the set of data blocks 145 at various points in time. The individual snapshots include snapshot numbers relating to the relative age of a snapshot Generally, the highest snapshot number corresponds to the most recent snapshot. Similar to the snapshot numbers included in the target volume 120, these snapshot numbers need not be a uniform sequence. Both the number and type of data blocks in the set of data blocks 145, as well as the number and sequence of snapshots in the set of snapshots 150, are exemplary and in no way limiting.

In a preferred embodiment, the target volume 140 is a read-only volume that is preferably used to replicate data from the source volume 120. When used as such, user I/Os 105 are not directed to the target volume 140, but rather to the source volume 120. A system 100 may include a plurality number of source volumes 120 and target volumes 140, such that the source volumes 120 mirror data to the redundant target volumes 140.

The logic 115 provides a technique for synchronizing a source volume 120 to a target volume 140, a target volume 140 to a source volume 120, or both. Generally, this technique is used when a source volume 120 is taken off line and a target volume 140 is temporarily used in it's place or when the target volume 140 is written to by any entity s other than the source volume 120.

Method of Use

Figure 2:
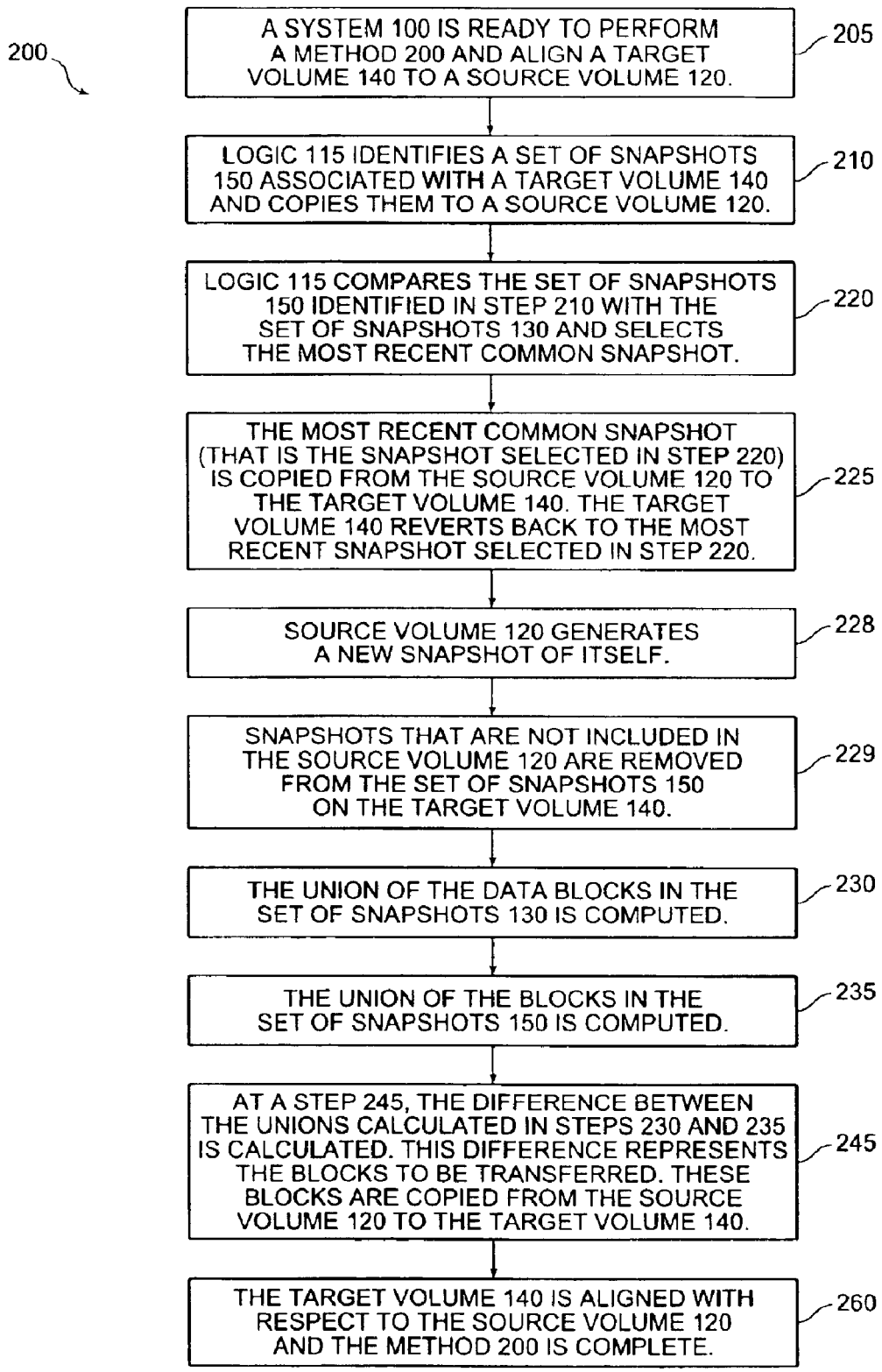
FIG. 2 shows a flow diagram of a method for synchronizing a target volume to a source volume.

FIG. 2 shows a flow diagram of a method for synchronizing a target volume to a source volume.

A method for synchronizing a target volume to a source volume (shown by general character reference 200) is performed by a system 100. Although a method 200 is described serially, steps of a method 200 can be performed by separate elements in conjunction or in parallel, whether asynchronously, in a pipelined manner, or otherwise. There is no particular requirement that a method 200 be performed in the same order in which this description lists the steps, except where so indicated.

At a flow point 205, a system 100 is ready to perform a method 200 and synchronize a target volume 140 to a source volume 120. The method 200 is preferably performed after a target volume 140 has been made writable.

In a step 210, the logic 115 identifies a set of snapshots 150 associated with a target volume 140 and copies the identifiers associated with those snapshots 150 to a source volume 120. For example, if the set of snapshots 150 includes snapshot numbers 1, 3, 4 and 6, those particular snapshots numbers are copied to the source volume 120.

At a step 220, the logic 115 compares the identifiers associated with the set of snapshots 150 identified in step 210 with the set of snapshots 130. The most recent snapshot that is common to both sets is selected. For example, if the identifiers include snapshot numbers 1, 3, 4 and 6 and the set of snapshots 130 includes snapshot numbers 1, 2, 4, and 5, then the most recent snapshot common to both sets is snapshot number 4.

At a step 225, the identifier associated with the most recent common snapshot (that is, the snapshot selected in step 220) is copied from the source volume 120 to the target volume 140. During this step, an alert may be sounded, informing the user I/O 105 that some of the data blocks unique to the snapshots newer than the newest common snapshot may be lost and a prompt for "confirmation" or "abort" may be issued. If there is a confirmation, the target volume 140 reverts back to the most recent snapshot selected in step 220. This reversion may be referred to as a "SnapRestore".

At a step 228, the source volume 120 generates a new snapshot of itself. This snapshot is used to preserve the set of data blocks 125 at the source volume 120 and to determine the incremental transfer of data blocks between the source volume 120 and target volume 140. Simultaneously, the target volume 140 is designated as a read only volume.

In a preferred embodiment, the source volume 120 may continue receiving reads and writes from clients.

At a step 229, the snapshots that are not included in the source volume 120 are removed from the set of snapshot 150 on the target volume 140. In this way, the target volume becomes synchronized with respect to snapshots that are not present on the source volume 120.

At a step 230, the union of the data blocks in the set of snapshots 130 is computed. This union will preferably include available and allocated data blocks from any one or more target snapshots 130. This step is preferably performed by the source volume 120. Steps 235 and 245 occur simultaneously with step 230.

At a step 235, the union of the blocks in the set of snapshots 150 is computed. This union will preferably include available and allocated data blocks from any one or more target snapshots 150. This step is preferably performed by the source volume 120. Step 235 is performed at the same time as steps 230 and 245.

At a step 245, difference between the unions calculated in steps 230 and 235 is calculated. This difference represents the blocks to be transferred. These blocks are copied from the source volume 120 to the target volume 140. In this way, the target volume 140 becomes synchronized with respect to blocks present on the source volume 120.

At a flow point 260, the target volume 140 is synchronized with respect to the source volume 120 and the method 200 is complete.

Figure 3:
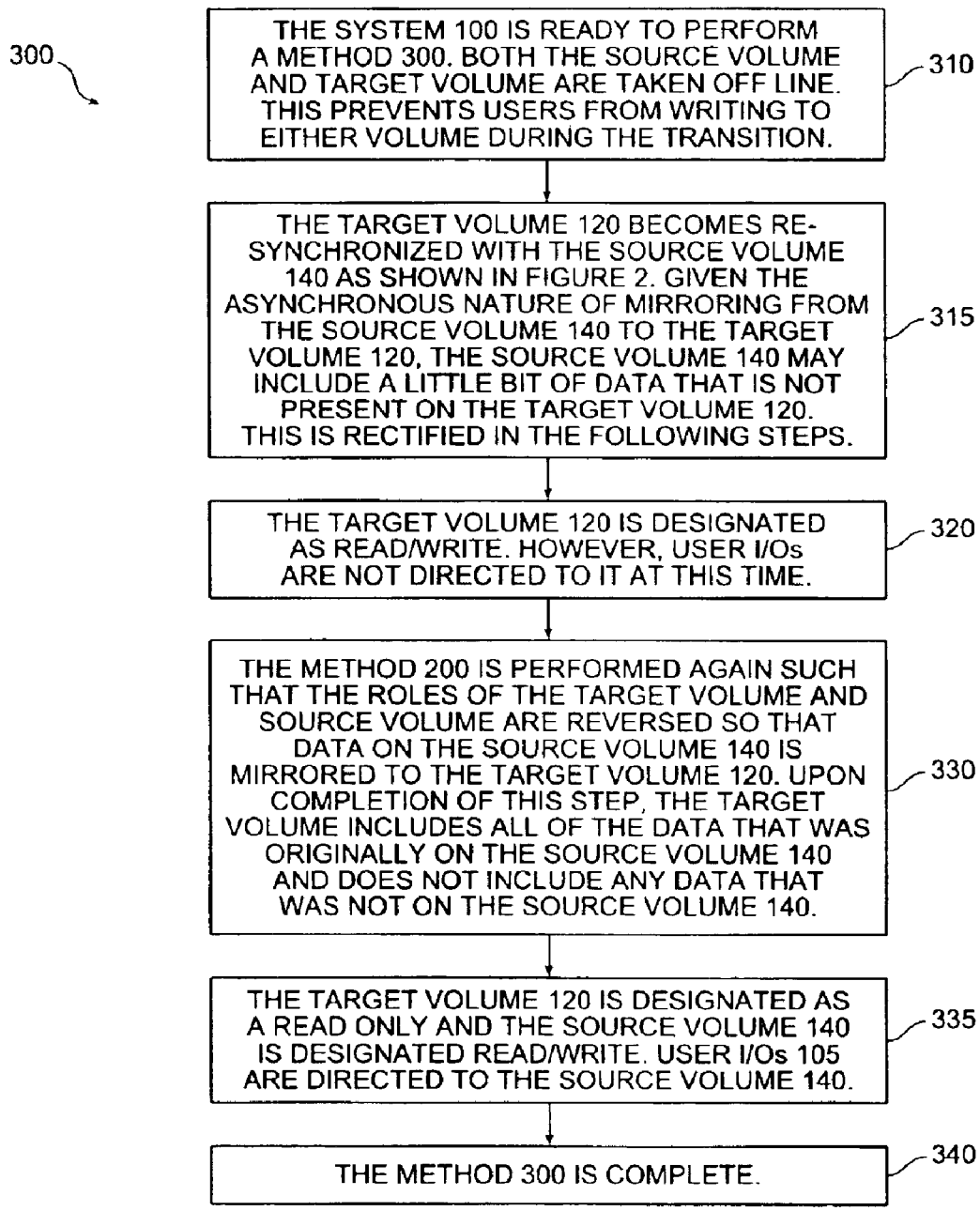
FIG. 3 shows a flow diagram a method for synchronizing a target volume and a source volume to each other.

FIG. 3 shows a flow diagram for synchronizing a target volume and a source volume to each other.

A method for aligning a target volume and a source volume to each other (shown by general character reference 300) is performed by a system 100. Although the method 300 is described serially, the steps of method 300 can be performed by separate elements in conjunction or in parallel, whether asynchronously, in a pipelined manner, or otherwise. There is no particular requirement that method 300 be performed in the same order, in which this description lists the steps, except where so indicated.

At a flow point 310, system 100 is ready to perform a method 300. The method 300 compensates for the asynchronous nature of mirroring data. At this time, both the source volume and target volume are taken off line. This prevents users form writing to either volume during the transition.

At a step 315, the target volume 120 becomes re-synchronized with the source volume 140 as shown in FIG. 2. Upon completion of step 315, the target volume 120 includes information stored on the source volume 140. However, given the asynchronous nature of mirroring from the source volume 140 to the target volume 120, the source volume 140 may include a little bit of data that is not present on the target volume 120. This inconsistency is rectified in the following steps.

At a step 320, the target volume 120 is designated as read/write. However, user I/Os are not directed to it at this time.

At a step 330, the method 200 is performed again such that the roles of the target volume and source volume are reversed so that data on the source volume 140 is mirrored to the target volume 120. Upon completion of this step, the target volume includes all of the date that was originally on the source volume 140 and does not include any data that was not on the source volume 140.

At a step 335, the target volume 120 is designated as a read only and the source volume 140 is designated read/write. User I/Os 105 are directed to the source volume 140.

At a flow point 340, the method 300 is complete.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for aligning a target volume and a source volume after said source volume has been written to, including comparing information about a set of snapshots associated with said source volume with information about a set of snapshots associated with said target volume to determine common information that said set of snapshots associated with said target volume and said set of snapshot associated with said source volume share in common;

reverting said target volume back to a state associated with said common information;

generating a new snapshot of the source volume;

calculating a difference between a first union of data blocks in the snapshots associated with the source volume and a second union of data blocks in the snapshots associated with the target volume; and transferring a set of data blocks corresponding to the difference from said source volume to said target volume, thereby aligning said target volume with said source volume.

2. A method as in claim 1, wherein said step of comparing includes reading a set of data blocks included in said set of snapshots associated with said source volume; and reading a set of data blocks included in said set of snapshots associated with said target volume.

3. A method as in claim 1, wherein said step of transferring includes writing data associated with said source volume to said target volume.

4. A method as in claim 1, also including saving said information about said set of snapshots associated with said target volume, wherein said information about said set of snapshots associated with said target volume concerns an initial state of said target volume prior to said step of transferring.

5. A method as in claim 1, wherein said common information includes a most recent information that said set of snapshots associated with said target volume and said set of snapshots associated with said source volume share in common.

6. A method as in claim 5, wherein said state to which said target volume is reverted back is a state associated with said most recent information.

7. A method as in claim 1, wherein said source volume may receive reads and writes from a client during said step of comparing.

8. A method as in claim 1, wherein said step of comparing is performed by a set of logic coupled to both said source volume and said target volume.

9. A method as in claim 1 also including generating an alarm to inform a user that data associated with said target volume may be lost.

10. A method as in claim 1, further including removing a set of data blocks from said target volume based upon a second result associated with said comparison.

11. An apparatus, including a processor, a memory and a set of instructions for aligning a target volume and a source volume after said source volume has been written to, including an instruction to compare information about a set of snapshots associated with said source volume with information about a set of snapshots associated with said target volume to determine common information that said set of snapshots associated with said target volume and said set of snapshots associated with said source volume share in common;

an instruction to revert said target volume back to a state associated with said common information;

an instruction to generate a new snapshot of the source volume;

an instruction to calculate a difference between a first union of data blocks in the snapshots associated with the source volume and a second union of data blocks in the snapshots associated with the target volume; and an instruction to transfer a set of data blocks corresponding to the difference from said source volume to said target volume.

12. An apparatus as in claim 11, wherein said set of instructions includes an instruction to save said information about said set of snapshots associated with said target volume, wherein said information about said set of snapshots associated with said target volume concerns an initial state of said target volume.

13. An apparatus as in claim 11, wherein said common information includes a most recent information that said set of snapshots associated with said target volume and said set of snapshot associated with said source volume share in common.

14. An apparatus as in claim 13, wherein said state to which said target volume is reverted back is a state associated with said most recent information that said set of snapshots associated with said target volume and said set of snapshots associated with said source volume share in common.

15. An apparatus as in claim 11, wherein said set of instructions includes an instruction to generate an alarm to inform a user that data associated with said target volume may be lost.

16. A method of aligning a first volume of data storage and a second volume of data storage, the method comprising:

identifying a set of snapshots of the first volume;

identifying a set of snapshots of the second volume;

selecting a most recent snapshot common to the first and second volumes;

reverting the second volume to a state associated with the most recent snapshot common to the first and second volumes;

generating a new snapshot of the first volume;

calculating a first difference between a union of data blocks in the snapshots associated with the first volume and a union of data blocks in the snapshots associated with the second volume; and transferring a set of data blocks corresponding to the first difference from the first volume to the second volume.

17. A method in accordance with claim 16, further comprising:

preventing users from writing to the first volume; and preventing users from writing to the second volume.

18. A method in accordance with claim 17, further comprising the following steps performed after the step of transferring a set of data blocks corresponding to the first difference:

reverting the first volume to a state associated with the most recent snapshot common to the first and second volumes;

calculating a second difference between a union of data blocks in the snapshots associated with the second volume and a union of data blocks in the snapshots associated with the first volume; and transferring a set of data blocks corresponding to the second difference from the second volume to the first volume.

19. A method in accordance with claim 18, further comprising generating a new snapshot of the second volume before the step of calculating a second difference.

20. A method in accordance with claim 19, further comprising removing snapshots that are not included in the first volume from the second volume, the step of removing being performed before the step of calculating a second difference.

21. Apparatus for aligning a first volume of data storage and a second volume of data storage, the apparatus comprising a memory with instructions embedded therein, and at least one processor coupled to the memory to read and execute the instructions, wherein the instructions, when executed by the at least one processor, cause the at least one processor to perform the steps of:

identifying a set of snapshots of the first volume;

identifying a set of snapshots of the second volume;

selecting a most recent snapshot common to the first and second volumes;

reverting the second volume to a state associated with the most recent snapshot common to the first and second volumes;

generating a new snapshot of the first volume;

calculating a first difference between a union of data blocks in the snapshots associated with the first volume and a union of data blocks in the snapshots associated with the second volume; and transferring a set of data blocks corresponding to the first difference from the first volume to the second volume.

22. Apparatus according to claim 21, wherein the instructions, when executed by the at least one processor, further cause the at least one processor to (1) prevent users from writing to the first volume, and (2) prevent users from writing to the second volume.

23. Apparatus according to claim 22, wherein the instructions, when executed by the at least one processor, further cause the at least one processor to generate a new snapshot of the second volume before the step of calculating a second difference.

24. Apparatus according to claim 23, wherein the instructions, when executed by the at least one processor, further cause the at least one processor to remove snapshots that are not included in the first volume from the second volume before the step of calculating a second difference.

25. An article of manufacture comprising a memory having program code embedded therein, the program code comprising instructions that, when executed by at least one processor coupled to a first volume of data storage and to a second volume of data storage, cause the at least one processor to perform the steps of:

identifying a set of snapshots of the first volume;

identifying a set of snapshots of the second volume;

selecting a most recent snapshot common to the first and second volumes;

reverting the second volume to a state associated with the most recent snapshot common to the first and second volumes;

generating a new snapshot of the first volume;

calculating a first difference between a union of data blocks in the snapshots associated with the first volume and a union of data blocks in the snapshots associated with the second volume; and transferring a set of data blocks corresponding to the first difference from the first volume to the second volume.

26. An article of manufacture according to claim 25, wherein the instructions, when executed by the at least one processor, further cause the at least one processor to (1) prevent users from writing to the first volume, and (2) prevent users from writing to the second volume.

27. An article of manufacture according to claim 26, wherein the instructions, when executed by the at least one processor, further cause the at least one processor to generate a new snapshot of the second volume before the step of calculating a second difference.

28. An article of manufacture according to claim 27, wherein the instructions, when executed by the at least one processor, further cause the at least one processor to remove snapshots that are not included in the first volume from the second volume before the step of calculating a second difference.

* * * * *